United States Patent
Magni et al.

(10) Patent No.: US 7,842,221 B2
(45) Date of Patent: Nov. 30, 2010

(54) PROCESS AND APPARATUS FOR THE PRODUCTION OF FILLED THERMOPLASTIC POLYMERS

(75) Inventors: Mauro Magni, Montesilvano (IT); Giuseppe Delzotto, Montesilvano (IT)

(73) Assignee: Magma Trade Di Mauro Magni & C. SAS, Pescara (IT)

( * ) Notice: Subject to any disclaimer, the term of this patent is extended or adjusted under 35 U.S.C. 154(b) by 557 days.

(21) Appl. No.: 10/482,395

(22) PCT Filed: Jul. 1, 2002

(86) PCT No.: PCT/IB02/02529

§ 371 (c)(1),
(2), (4) Date: Jun. 18, 2004

(87) PCT Pub. No.: WO03/004236

PCT Pub. Date: Jan. 16, 2003

(65) Prior Publication Data

US 2004/0232578 A1 Nov. 25, 2004

(30) Foreign Application Priority Data

Jul. 2, 2001 (EP) .................................. 01830444

(51) Int. Cl.
*B29C 47/00* (2006.01)

(52) U.S. Cl. .................. 264/322; 264/211; 264/319; 264/328.18; 425/202; 425/204; 425/205; 241/282.2; 241/277; 241/282.1; 366/76.3; 366/76.6; 366/307; 366/156.2; 366/319

(58) Field of Classification Search .................. 425/202, 425/204, 205, 207; 264/37.32, 211, 319, 264/322, 328.18; 241/199.12, 281.1, 282.2, 241/277; 366/76.3, 307, 76.6, 87, 156.2, 366/319

See application file for complete search history.

(56) References Cited

U.S. PATENT DOCUMENTS

| 2,253,319 A | * | 8/1941 | Batterman | .................. 426/302 |
| 2,537,130 A | * | 1/1951 | Arthur | ........................ 528/499 |
| 3,036,745 A | * | 5/1962 | Johnson | ...................... 222/411 |
| 3,121,911 A | * | 2/1964 | Lightner | ..................... 425/208 |

(Continued)

FOREIGN PATENT DOCUMENTS

CH 448481 11/1968

(Continued)

OTHER PUBLICATIONS

Thieme Chemistry-ROMPP ONLINE (www.roempee.com) 2006.

(Continued)

*Primary Examiner*—Eric Hug
*Assistant Examiner*—Seyed Masoud Malekzadeh
(74) *Attorney, Agent, or Firm*—Millen, White, Zelano & Branigan, P.C.

(57) ABSTRACT

To produce filled thermoplastic polymers starting from a waste thermoplastic base material, the base thermoplastic material is fed into a container (1) provided with a device for mixing and stirring (2,3) in which the base thermoplastic material is softened, the required filler is fed into said device and stirring is continued to thoroughly blend filler and softened material, subsequently collecting the softened and filled material from said container and subjecting it to an extrusion or other densification step.

25 Claims, 2 Drawing Sheets

U.S. PATENT DOCUMENTS

| | | | | |
|---|---|---|---|---|
| 3,551,166 | A | * | 12/1970 | Jurgen et al. .................. 426/98 |
| 3,552,722 | A | | 1/1971 | Sutter |
| 3,862,084 | A | | 1/1975 | Zandstra et al. |
| 3,995,838 | A | * | 12/1976 | Zucker .................... 366/160.2 |
| 4,014,462 | A | | 3/1977 | Robertson |
| 4,225,640 | A | | 9/1980 | Erb |
| 4,334,784 | A | * | 6/1982 | Engels ...................... 366/76.3 |
| 4,344,579 | A | * | 8/1982 | Morita et al. ................. 241/34 |
| 4,597,537 | A | * | 7/1986 | Misaka et al. .............. 241/79.1 |
| 4,703,093 | A | * | 10/1987 | Thurman .................... 525/387 |
| 4,740,767 | A | * | 4/1988 | Kawano et al. ............. 399/119 |
| 4,753,762 | A | * | 6/1988 | Li et al. .......................... 264/54 |
| 4,764,020 | A | * | 8/1988 | Moriyama ................. 366/76.4 |
| 5,114,331 | A | | 5/1992 | Umehara et al. |
| 5,217,800 | A | | 6/1993 | Pentecost |
| 5,225,137 | A | * | 7/1993 | Sadr .......................... 264/349 |
| 5,238,633 | A | * | 8/1993 | Jameson ................ 264/211.23 |
| 5,253,994 | A | * | 10/1993 | Zweig et al. ................. 425/130 |
| 5,437,826 | A | * | 8/1995 | Martinello et al. .......... 264/102 |
| 5,635,125 | A | | 6/1997 | Ternes et al. |
| 5,728,411 | A | * | 3/1998 | Fowler ...................... 425/142 |
| 5,843,524 | A | * | 12/1998 | Wimolkiatisak et al. ..... 427/212 |
| 5,863,480 | A | * | 1/1999 | Suwanda ................. 264/209.8 |
| 6,156,821 | A | * | 12/2000 | Cantarini .................... 523/200 |
| 6,168,306 | B1 | * | 1/2001 | Degady et al. ............. 366/76.1 |
| 6,619,575 | B1 | * | 9/2003 | Bacher et al. ............ 241/46.11 |
| 6,662,515 | B2 | | 12/2003 | Buhrts et al. |

FOREIGN PATENT DOCUMENTS

| | | |
|---|---|---|
| DE | 2052031 | 11/1971 |
| DE | 2226287 | 12/1972 |
| DE | 2 312 260 | 9/1973 |
| DE | 25 21 551 | 11/1976 |
| DE | 43 22 771 | 1/1995 |
| DE | 19718138 | 11/1998 |
| DE | WO 01/21372 A1 * | 3/2001 |
| EP | 0 123 771 | 12/1983 |
| EP | 0 471 463 A2 | 2/1992 |
| EP | 0911131 | 4/1999 |
| EP | 0 913 239 A1 | 5/1999 |
| FR | 2564374 | 11/1985 |
| GB | 1328019 | 8/1973 |
| JP | 55133428 A | 10/1980 |
| JP | 55-169407 | 12/1980 |
| JP | 57149342 A | 3/1981 |
| JP | 58080330 A | 5/1983 |
| JP | 03193413 A | 12/1989 |
| WO | WO 00/64654 A1 * | 11/2000 |
| WO | WO 01/21372 A1 * | 3/2001 |
| WO | 0181058 | 11/2001 |

OTHER PUBLICATIONS

1 EREMA Recycling Installation RGA 63T: 1 ERMA Recycling Installation RGA 160 T + 5D; Nov. 5, 1997.
EREMA Recycling System RGA 120 TE; Aug. 7, 1996.
EREMA Recycling Plant RGA 120 TE; Oct. 21, 1999.
EREMA Recycling Plant RGA 160 TVE; Sep. 21, 1995.
EREMA Recycling Anlage RGA 160 TVE; May 14, 1997.
EREMA Recycling Plant RGA 120 TVA; Jul. 7, 2000.
EREMA Recycling Plant RGA 100 TVE-HG; Nov. 23, 2000.
Addition for EREMA R, Jan. 22, 1997.
EP Op reference citation No. D24: Recycling News- Jan. 1996 edition 1-EREMA.
EP Op reference citation No. D25:Information printed Jul. 2006: Erema Plastic Recycling System with high performance degrassing TVE.
EP Op reference citation No. D26: Telefax to RD Plast from Mr. Nielson.
EP Op reference citation No. D27: Information: Erema RGA 120.
EP Op reference citation No. D30:MUOVIPORTTI 1998 (18 pages labeled 30a-30f).

* cited by examiner

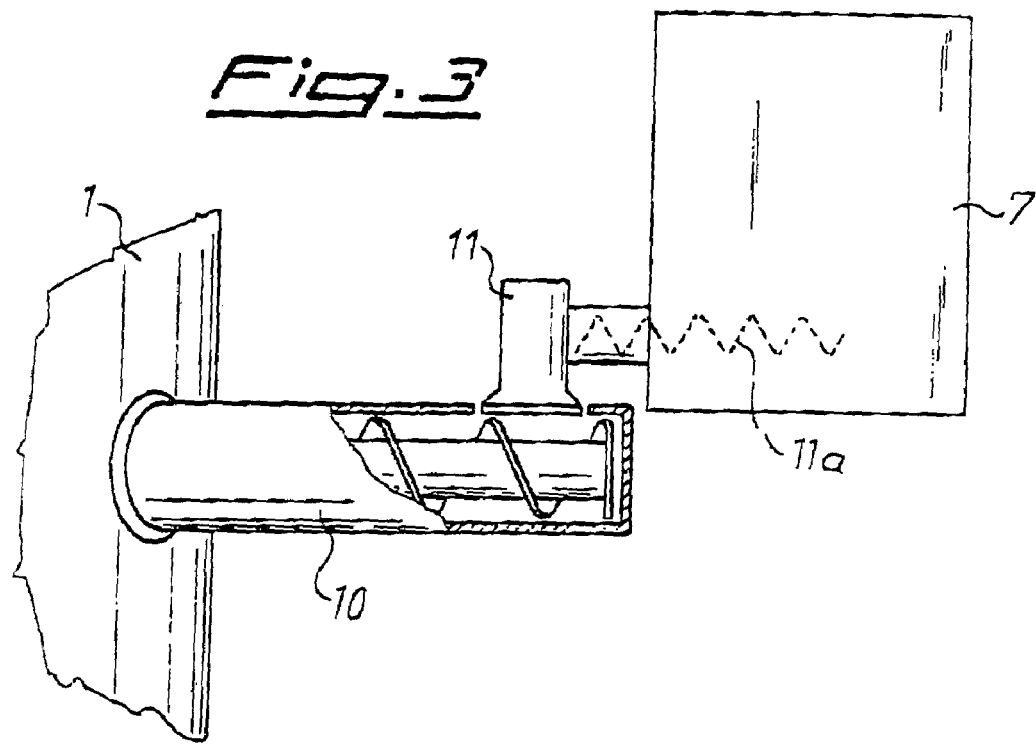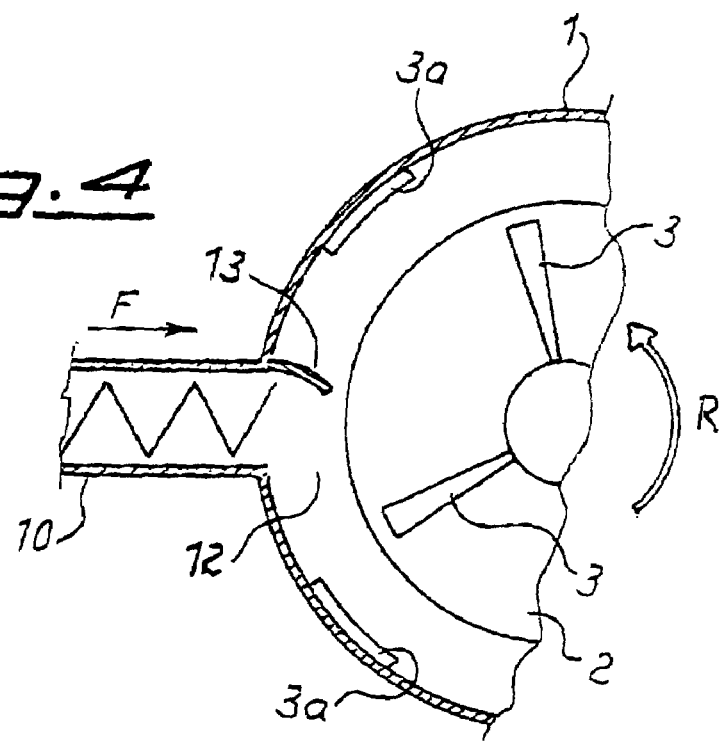

PROCESS AND APPARATUS FOR THE PRODUCTION OF FILLED THERMOPLASTIC POLYMERS

FIELD OF THE INVENTION

The present invention relates to a process and an apparatus for producing filled thermoplastic polymers. More particularly, the invention relates to a process and an apparatus for producing thermoplastic polymeric materials filled with inert fillers, such as mineral fillers and fibers, also known as "compounds".

BACKGROUND OF THE INVENTION

Inert fillers, i.e. fillers which do not react with the base polymer, are commonly added to thermoplastic polymers, their main functions being to reduce the average cost of the product, the cooling times of the shaped piece and to provide the filled polymer with different technical features with respect to the initial polymer. Examples of fillers are calcium carbonate, silica, barium sulphate, talcum powder, wood powder or fibers, cellulose fibers and glass fibres. The amount of added filler generally is from 15 to 80% by weight of the polymeric base and preferably it is within the range of 30 to 70% by weight Polymeric materials of interest are thermoplastic resins and particularly PP, PE and polyolefins in general, PVC ABS, etc; the material is a homo or copolymer and is a monomaterial or a mixture of compatible materials, e.g. PP/PE. In other words, mixtures of non-compatible materials are not within the scope of the present invention and with the wording thermoplastic material a monomaterial or a mixture of compatible material is meant.

Preferred thermoplastic material are industrial waste materials, such as production scrap, e.g. BO PP and PP/PE sheets scrap resulting from production of diapers and bi-oriented film, scraps resulting from production of non-woven fabrics and non-woven products, polymer powders deriving from polymerization processes and polymers productions.

According to the prior art, fillers are added to thermoplastic polymers after the polymeric material has been brought to a molten state. For example granules of polymeric material, or polymer material in a densified condition, are fed to an extruder and the filler is fed at one or more points of the cylinder of the extrusion screw after melting and plasticizing the polymer material; the filled material is granulated again when leaving the screw cylinder. The main disadvantage of this process is the cost of a process starting with material in the form of granules or pellets to again obtain granules or pellets of the filled material. This disadvantage is particularly felt when the polymeric material is a recycled material.

To obviate this problem it was proposed to fill the polymer granules or densified material during their processing step, for example during the extrusion or injection moulding of the shaped product; however, this solution proved to be applicable only in part, because the final user of the material prefers to use a compound already having the necessary amount of filler for obvious reasons of simplicity, lower costs of the process and cheaper and easier to use moulding and extrusion machinery.

U.S. Pat. No. 4,225,640 (Erb) discloses a method of reclaiming municipal waste by blending fragments of different and incompatible plastic materials and of dried leaves and by extruding the mix. Heat is applied in the extruder to fuse the thermoplastic materials and incorporate therein the leaf fragments. In one embodiment the thermoplastic materials are melted and fused before mixing them with the leaves fragments. The product leaving the extruder is a consolidated mass of leaves bonded by the plastics, where the leaf fragments serve as a bridge to integrate different thermoplastic materials that would not otherwise combine together.

DE-A-19718138 (Ermafa) relates to a recycling machine that fragments and agglomerates thermoplastic materials until C preset amount of material is treated in the machine; the material is then fused and "shock water" is added to solidify it within the machine. The solid and agglomerated material is then dried, fragmented and extracted from the machine. The document is silent about fillers.

U.S. Pat. No. 5,635,125 (Ternes) discloses a shingle obtained by grinding fiber-reinforced PVC material (namely garden hoses), mixing the ground hose with sawdust and extruding the mix. Again, in this document the filler is incorporated in the molten plastic material during extrusion.

U.S. Pat. No. 3,552,722 (Sutter) deals with the problem of uniformly mixing powdered plastic and fragments of plastic material before feeding the mix to an extruder or kneading and heating device. The disclosed apparatus does not carry out any shredding or softening of the material and no fillers are mentioned.

EP-A-0911131 (Gamma Meccanica) discloses an apparatus for fragmenting, shredding and densifying a plastic material. The apparatus comprises a container with a rotator that shreds the plastic material and pushes it into a first screw that is tangential to the container and that carries the material to an extruder screw. Feeding means are provided for feeding dyes or granulated plastic to the tangential screw. The cited arrangement should ensure a more uniform feeding of shredded plastic to the extruder.

DESCRIPTION OF THE INVENTION

There is therefore the need for a process of producing a filled thermoplastic compound. i.e. a thermoplastic polymeric base material filled with inert fillers, at lower costs than those currently available by using an apparatus that is a simple and not expensive.

There is also the need of a filled thermoplastic compound that is cheaper than the known products but has the same or better technical characteristics than corresponding known products.

It is an object of the present invention to solve the above mentioned problem by means of a process of producing filled thermoplastic materials that is cheaper than traditional processes and that can provide a product (that is, a filled granule) with a substantially constant composition, specifically with a substantially uniform percentage of filler in all the granules produced, and that is provided with the same or better technical properties than the presently known corresponding compounds.

This object is attained by means of the present invention, concerning a process to produce filled thermoplastic polymers according to claim 1.

Another object of the patent is on apparatus to produce filled thermoplastic polymers consistent with the aforesaid process, characterized according to claim 6.

According to a preferred embodiment of the invention, the polymeric base is industrial waste material and is softened by being stirred and shred in a vertical container, also called "hot mill", where the heat required to soften the base polymeric material is provided by the friction generated by the stirring and shredding action.

According to another aspect of the invention, the process is a continuous process wherein the material is fed to the container from the top and the softened and filled polymeric base is removed from the bottom; and wherein the filler is fed to the lower part of the container, where the polymeric base is in a softened state.

According to a further preferred aspect of the invention, the filler is fed by means of a gravimetric metering device and the outlet of means for feeding the filler into the container is screened against the flow of softened material.

The process and apparatus according to the invention allows to obtain a filled material, that is to say a "compound", from industrial scraps or waste, with production costs that are much lower than the costs of a traditional process; the reduction in production costs, starting from the same base material, is generally about 25-30% and may reach 50%. The percentage of filler in the final product is constant through the production and may reach up to 70% of the total weight.

The invention also gives the advantage that the thermoplastic material is subjected to only one thermal treatment instead of two as in prior art processes; this will result is less loss of the properties of the thermoplastic material.

BRIEF DESCRIPTION OF THE DRAWINGS

The invention shall now be discussed in greater detail with reference to the annexed drawings as a non-limiting illustrative example, in which:

FIG. 3 is a schematic side view of a gravimetric loading device and its connection to the container; and FIG. 4 is a schematic view of a detail of the outlet of the filler feed in the stirring container.

BEST MODE FOR CARRYING OUT THE INVENTION

Figure 1:
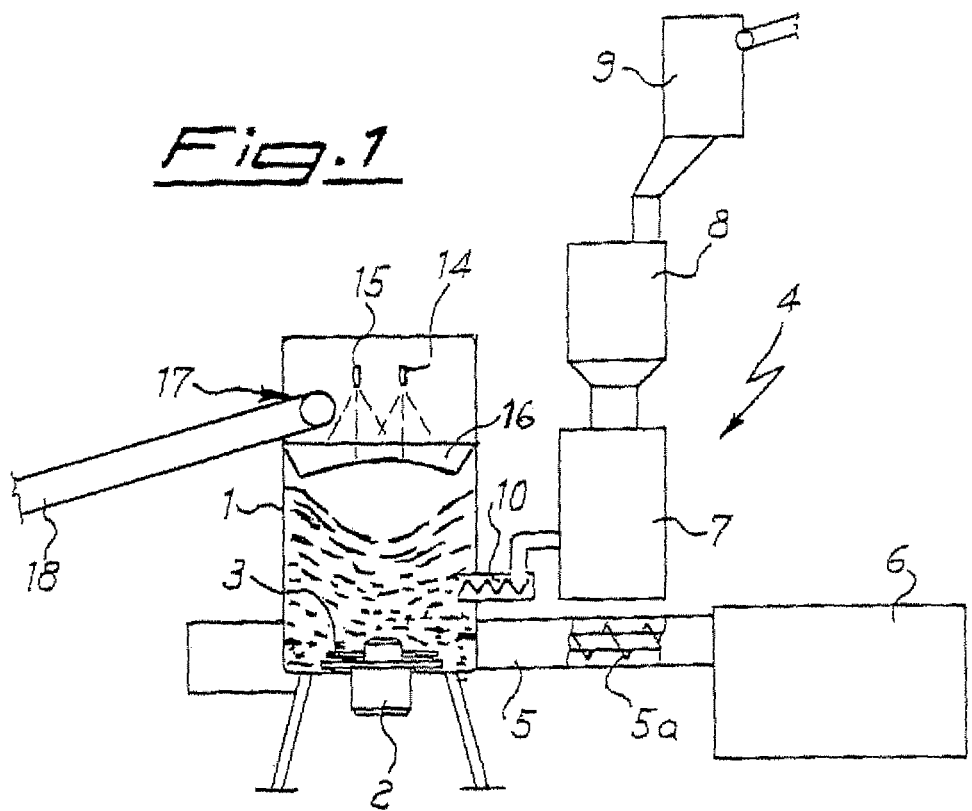
FIG. 1 is a schematic view of an apparatus according to the invention.

As can be seen in FIG. 1, the apparatus, or system, according to the invention comprises a "hot mill", i.e. a cylindrical vertical container 1 provided with a stirring element 2 fitted rotatably on the base of the container and provided with a plurality of blades 3. Further blades 3a are mounted stationary on the wall and co-operate with blades 3 to stir and disintegrate the thermoplastic material and soften it without melting it. Container 1 is laterally provided with feeding means 4 for feeding fillers, for example calcium carbonate, to the container and with exit means 5 to collect from the container the final material that is to say the softened polymeric base added with the filler.

According to another embodiment of the invention, the filler feeding means 4 can be positioned at a location above the level of the thermoplastic material within container 1; it is also possible to feed the weighed filler together with the thermoplastic material, e.g. both filler and thermoplastic material are fed to container 1 from belt elevator 18.

In general addition of the filler is carried out before or after the material has reached its softened condition but in any case before the material has melted, In other words, addition of the filler to the polymeric material and its mixing with it, are carried out when the material has not been melted and thus it is not compact and dense, yet, but is still "aerated" because it comes from shredded pieces and is in a softened condition.

The filler is thoroughly mixed with the thermoplastic resin material by the rotating stirrer and blades, i.e., according to the invention filler and softened thermoplastic material are mixed within container 1; the high speed of stirrer and blades also provides the heat required to soften the thermoplastic material.

With the wording "softened thermoplastic material"; "softened" and "softening" it is hereby meant a material in a condition as obtainable in a range of temperature that goes from just before the melting point of the material to about 20-25 degrees below the Vicat softening point of the material as determined by ASTM D1525; ISO 306, "A". Preferably, the temperature of the material at the bottom of the container, i.e. hot mill, is maintained within the range of 5-10° C. less than the melting point and 15-20° C. less than the Vicat softening point of said material.

In the case of polypropylene and polypropylene/ethylene materials, where the softening point is about 140-150° C. and the melting point is 168-171° C. (for polypropylene), the range of temperature resulting in a softened material is within the range from about 120-125° C. to about 165-170° C. Preferably, the temperature is of about 130-160° C.

The actual values for each material are obtained from the manufacturer or by tests carried out on the material, the latter case being more frequent when waste materials are recycled into filled compounds.

After leaving hot mill 1 the filled material is subjected to at least one step of densification (e.g. agglomeration) by increasing its bulk density to obtain a material easy to use in subsequent processing. This step can be performed immediately or subsequently; it is preferable to perform a plastification and granulation of the material immediately.

The means for collecting and processing the softened material are preferably composed of a conveyor screw that can vary in length according to the degree of plasticization to be given to the material.

A short screw will give a densified product, an extruder will give a pelletized product. The conveyor screw can be positioned radially or tangentially to the container 1.

Figure 2:
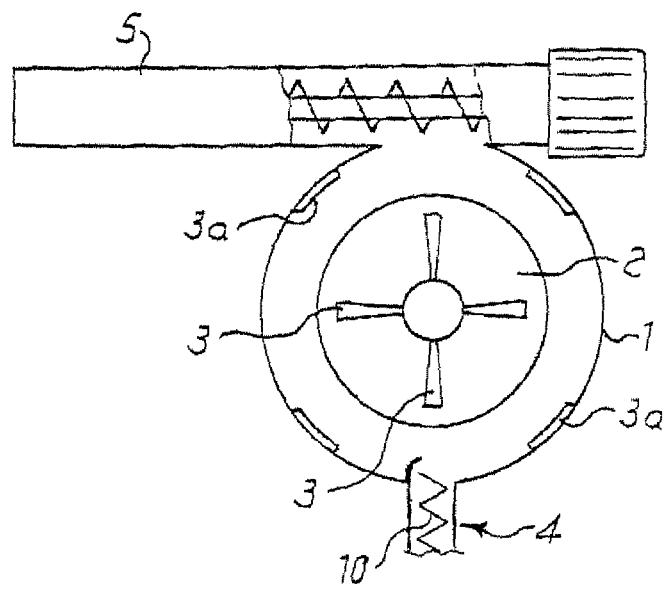
FIG. 2 is a schematic top view of the container and part of the devices connected to this.

In the embodiment shown in the accompanying figures, means 5 is composed of an extruder, provided in known manner with a screw 5a and means for filtering, degassing, etc., the molten material at the end of the extruder, where is also provided a pelletizing device or granulator. Filter, degassing device and granulator, generally identified with reference 6, are known to the art and are not shown in detail in FIGS. 1 and 2. Preferably, the extruder is located tangentially to container 1 according to the teaching of U.S. Pat. No. 4,222,728 in the name of Kraus-Maffei, Asten, Austria, where it is disclosed an apparatus used to recycle waste thermoplastic material from industrial process, similar to part of the apparatus according to this invention and comprising a shredding hot mill and an extruder.

Tangential extruder 5 communicates with container 1 through opening 19 and may be of the traditional or two-screw type, either horizontal or vertical; in one embodiment the extruder is provided, in a way known in the art with feeding means to feed further filler, for example a different filler from the first, to the treated material.

The means to feed the filler comprise a metering device 7 that receives the filler material from a silo 8 which is in turn connected to a "drawing" silo 9 which receives the filler from storage silos (not shown). The metering device 7 feeds the filler to a screw 10 that has its outlet in the container 1.

Preferably, the metering device 7 is a gravimetric metering device, such as the one shown schematically in FIG. 3. According to a preferred embodiment, the gravimetric metering device 7 is mounted on a dedicated structure (not shown), i.e. on a structure that is different from the structure of container 1 or any structure connected thereto; in any case, as shown in FIG. 3, device 7 is physically detached from the cylinder of screw 10, that feeds the filler into container 1. As can be seen, the metering device takes the weighed filler to an inverted hopper 11 by means of a first screw 11a, the filler falls into the feed screw 10, which is positioned under and adjacent to the metering device 7 and to the hopper 11 without being physically connected to these elements, while it is fixed to the container 1. The use of a "suspended" gravimetric metering device, i.e. of filler feeding means that are comprising metering means detached from the screw feeding the metered filler into the hot mill 1, makes it possible to obtain an extremely high constancy and uniformity in the percentage of filler in the final material.

As previously mentioned, outlet 12 of screw 10 is preferably located in the lower portion of the container 1, i.e. in the portion of the container where the thermoplastic material has been brought to a softened condition by the disintegrating and stirring action performed by blades 3 and 3a. With this arrangement the dispersion of dusts of the filler into the environment is avoided or extremely reduced.

In view of the high stirring speed of the rotating blades, which is in the range of 700-1200 rpm and preferably 800-1000 rpm, to avoid interference in the feed of filler to the material outlet 12 is protected by a screen 13 positioned upstream of the outlet 12 with respect to the movement of the material, indicated with arrow R in FIG. 4.

Positioned in the upper portion of the container 1 are nozzles 14 and 15 to feed, preferably by nebulization, water and oil respectively.

Water is sprayed when the temperature of the material in the lower area, which rotates faster, reaches a limit value above which the material may pass from its softened state to a molten state. Upon contact with the hot polymeric material the water evaporates and cools the mass being stirred; the steam that is generated is treated in a known way, for example by suction through an exhaust fan (not shown). The oil, which may be mineral or of vegetable origin, has the known function of "lubricating" the material and also of "wetting" the dusty filler and prevent or limit dust from exiting the container. For this purpose the container is also provided with a ring 16 facing inward and tilting downward.

Operation of the apparatus according to the process relating to the present invention is preferably continuous, as follows.

The material is fed to the container 1 through the inlet 17 by means of a belt elevator-conveyor 18 and falls into the vertical container, i.e. the "hot mill" 1, where it is stirred, disintegrated and softened by blades 3 and 3a. The quantity of material fed is known, for example because it is weighed in advance or because it is measured by one or more load cells while being fed along the conveyor 18.

According to the quantity and percentage of filler desired, the metering device 7 feeds a corresponding amount of filler to the container by means of screw 11a and screw 10. This metering is particularly accurate thanks to the use of the gravimetric metering device and the screen 13 protecting outlet 12 of screw 10. In fact, thanks to this it is not necessary to adopt powerful feed means, which moreover would not be feasible in view of the physical separation required between the screw 10 and the gravimetric metering device 7 and the consequent uncovered opening located below the hopper 11. As previously mentioned, in a different embodiment of the invention process the filler is added to the thermoplastic material before this is fed to hot mill 1.

As previously mentioned, the plastic material at the top of the material pile in the hot mill or container 1 has its original shape.(e.g. a leaf) and the material at the bottom of container 1 is shredded, disintegrated and softened but it has not melt or fused. To avoid melting of the material, i.e. to maintain the material in its softened condition, the temperature of the material at the bottom of container 1 is controlled by sensors, e.g. thermocouples, and if it reaches a pre-established threshold, for example in the range of 140-150° C. for polypropylene, the nozzles 14 are activated to spray an amount of water sufficient to lower the material temperature to the desired value. This value is within the range from the maximum temperature that can be reached without melting the material and about 20-25° C. less than the VICAT softening point according to ASTM D 1525 or ISO 306 (10 N).

The softened material, filled and delivered from the container is collected by means that subject it to a further steps of treatment that envisages at least its densification, i.e. bulk density increase, e.g. by extrusion through a short screw or an extruder and possibly a final pelletization. In other words, in this step the material is transformed into a product (preferably a granule) that can be fed to an extruder or another moulding machine without further treatment.

The granules can optionally be mixed in a mixing and homogenising silo (not shown) before packaging.

The process is performed continuously and material is added as it is collected from the base by means of the extruder. The various processing parameters are controlled by sensors, e.g. thermocouples for the temperature of the softened material, sensors to measure the energy absorbed by the electric motor 2 to detect the conditions of the thermoplastic material, and a PLC that operates the apparatus in a substantially automatic manner.

EXAMPLE 1

In a typical process 400 kg/hour of waste polypropylene sheets are fed to a 2000 litre vertical container (hot mill) provided with a stirring/shredding device that rotates at 850 rpm and with a delivery extruder having a L/D ratio of 32, the extruder being provided with degassing, continuous filter and final granulator. The PP sheets fed to the container are weighed by four loading cells while it is being transported along belt conveyor 18, which is activated according to the quantity of material present in the container and its condition. The material is disintegrated and softened by the action of the stirring device and the blades 3 and 3a, so that a gradient of material is formed in the container, with material still in sheets in the upper part and softened and shredded material in the lower part of the container. The metering device 7 feeds 400 kg/hour of calcium carbonate with a ratio that is according to the amount of PP fed by belt elevator 18; the filler is fed to the area of the container in which the material is softened (130-150° C. for polypropylene) and the filler is mixed to the material which is then collected through the opening 19 by the extruder 5. The material is plasticized and melt in the extruder, degassed, filtered and granulated into pellets to give 800 kg/hour of polypropylene granules filled 50% with calcium carbonate.

The cost of the product is about 30% lower than the same product obtained from the same starting materials but according to prior art process.

EXAMPLE 2

400 kg/hour of waste polypropylene sheets and 600 kg/hour of calcium carbonate are treated according to the process of example 1 to give 1000 kg/hour of 60% PP granules. The cost of this product is about 30% less than the traditionally obtained product.

The invention claimed is:

1. A process for producing thermoplastic material containing a filler, said process comprising: feeding a base thermoplastic material to a container (1) provided with a mixer and stirrer (2, 3); increasing the temperature of the base thermoplastic material until said material has reached a softened condition; mixing a filler with said softened thermoplastic material within said container (1); collecting said material filled with said filler from said container; and carrying out a densification step of said softened and filled material.

2. A process according to claim 1, mixer and stirrer comprises a disintegrater (3, 3a) and wherein said base thermoplastic material is softened by stirring and disintegration.

3. A process according to claim 1, wherein the temperature of said softened thermoplastic material is within the range of its melting point and 25° C. less than its Vicat softening point (10N), the melting point temperature being excluded.

4. A process according to claim 1, wherein said densification step is an extrusion step.

5. A process according to claim 1, wherein the thermoplastic material is an industrial waste material to be recycled.

6. An apparatus for producing filled thermoplastic material, said apparatus comprising a container (1) having an inner ring facing inward and tilting downwardly, the container being provided with a stirring element (2) fitted rotatably on the base of the container and provided with a plurality of blades (3) for stirring and disintegrating the thermoplastic material and bringing the thermoplastic material to a softened condition, a filler feeder (7,10) for feeding a filler into said thermoplastic material within said container, said filler feeder (7, 10) being located in the lower portion of the container where the thermoplastic material is in a softened condition, and a liquid feeder in the form of nozzles (14 and 15) for feeding water and oil into the container (1).

7. An apparatus according to claim 6, wherein said container comprises a disintegrator (3, 3a) for disintegrating said thermoplastic material.

8. An apparatus according to claim 7, wherein said filler feeder comprises gravimetric metering means (7), separate from said container (1).

9. An apparatus for producing filled thermoplastic material, said apparatus comprising a container (1) having a base (1a) and a wall (1b) providing a disintegrator having a plurality of blades (3, 3a) at a lower portion of the container (1) for disintegrating said thermoplastic material, the blades (3) being rotatably mounted on the base (1a) of the container (1) to provide a stifling element (2) for bringing the thermoplastic material to a softened condition and the blades (3a) being stationary and mounted on the wall (1b) of the container (1) of the stirring element (2) to disintegrate the thermoplastic material;
a filler into the thermoplastic material, the filler feeder (7, 10) being located in the lower portion of the container (1) where the thermoplastic material is in a softened condition.

10. An apparatus according to claim 9, wherein said filler feeder (10) is located at a portion of said container (1) where the stirred material is in a softened state.

11. An apparatus according to claim 9, further comprising a screen (13) located at the outlet (12) of said filler feeder (10) for feeding filler into said container (1).

12. An apparatus of claim 9 further comprising a collector (5) for collecting the softened and filled material from said container (1) and a densifier (5,6) for subjecting said filler material to at least one densification step.

13. An apparatus according to claim 12, wherein the collector (5) for collecting the softened and filled material and said densifier (5, 6) for subjecting said filled material to at least one densification step comprises an extruder (5) and a granulator (6).

14. An apparatus according to claim 13, wherein said extruder is connected tangentially to said container.

15. An apparatus for producing filled thermoplastic material, said apparatus comprising a container (1) having a base (1a) and a wall (1b) providing a disintegrator having a plurality of blades (3, 3a) at a lower portion of the container (1) for disintegrating said thermoplastic material, the blades (3) being rotatably mounted on the base (1a) of the container (1) to provide a stifling element (2) for bringing the thermoplastic material to a softened condition and the blades (3a) being stationary and cooperating with the blades (3) for disintegrating the thermoplastic material;
a filler feeder (7, 10) for feeding a filler into the thermoplastic material, the filler feeder (7, 10) being located in the lower portion of the container (1) where the thermoplastic material is in a softened condition, and
an apparatus according to claim 7 wherein said filler feeder comprises a gravimetric metering arrangement (7) which is separate from said container (1), and said filler feeder (10) is a feed screw,
said gravimetric metering arrangement (7) comprising an inverted hopper (11) and a screw (11a), said inverted hopper (11) being positioned above the feed screw, whereby filler is removed from metering device via said screw (11a) and introduced into inverted hopper (11), from where it falls into feed screw (10).

16. An apparatus according to claim 15, wherein the stationary blades (3a) are mounted on the wall (1b) of the container (1) and cooperate with the blades (3) of the stirring element (2) to disintegrate said thermoplastic material.

17. An apparatus according to claim 16, further comprising a screen for screening (13) the outlet (12) of said filler feeder (10) for filler feeding into said container (1).

18. An apparatus according to claim 9, wherein said container further comprises a belt elevator-conveyor for feeding thermoplastic material into said container (1).

19. A process of producing thermoplastic material containing a filler, said process comprising: feeding a base thermoplastic material to said container (1) of the apparatus according to claim 9 increasing the temperature of the base thermoplastic material until said material has reached a softened condition; mixing a filler with said softened thermoplastic material within said container (1); collecting said material filled with said filler from said container and carrying out a densification step of said softened and filled material.

20. An apparatus for producing filled thermoplastic material, said apparatus comprising a container (1) having a mixture and stirrer (2, 3) for bringing said thermoplastic polymeric material to a softened condition, a filler feeder (7, 10) for feeding a filler into said thermoplastic material within said container, said filler feeder (7, 10) being located in the lower portion of the container where the thermoplastic material is in a softened condition; said filler feeder further comprising a gravimetric metering arrangement (7) which is separate from said container (1), and said filler feeder (10) is a feed screw, wherein said gravimetric metering arrangement (7) comprises an inverted hopper (11) and a screw (11a), said inverter hopper (11) being positioned above the feed screw, whereby filler is removed from metering device via said screw (11a) and introduced into inverted hopper (11), from where it falls into feed screw (10);
a disintegrator (3, 3a) disposed in the container for disintegrating said thermoplastic material, and a collector (5) for collecting the softened and filled material from said container (1), and a densifier (5,6) for subjecting said filled material to at least one densification step.

21. An apparatus according to claim 20, wherein said mixer and stirrer (2, 3) for mixing and stirring and for bringing said thermoplastic polymeric material to a softened condition comprises a rotatable stirring element (2) provided with a plurality of blades (3) and positioned at the base of the container, and said disintegrator (3, 3a) for disintegration of said thermoplastic material comprises stationary blades (3a) mounted on the wall of the container which cooperate with the blades (3) of the stifling element (2) to disintegrate said thermoplastic material.

22. An apparatus according to claim 20, wherein said mixer and stirrer (2, 3) for mixing and stirring and for bringing said thermoplastic polymeric material to a softened condition comprises a rotatable stirring element (2) provided with a plurality of blades (3) positioned at the base of the container, and said disintegrator (3, 3a) for disintegration of said thermoplastic material comprise stationary blades (3a) for disintegration of said thermoplastic material comprise stationary blades (3a) mounted on the wall of the container, which stationary blades (3a) cooperate with the blades (3) of the stifling element (2) to disintegrate said thermoplastic material.

23. An apparatus according to claim 22, further comprising a screen (13) for screening the outlet (12) of said filler feeder (10) for feeding filler into said container (1).

24. An apparatus for producing filled thermoplastic material, said apparatus comprising a container (1) having a mixer and stirrer (2, 3) bringing said thermoplastic polymeric material to a softened condition, a filler feeder (7, 10) for feeding a filler into said thermoplastic material within said container, said filler feeder (7, 10) being located in the lower portion of the container where the thermoplastic material is in a softened condition; said container (1) further comprising an inner ring facing inward and tilting downward;

- a liquid feeder (14 and/or 15) to feed water and/or oil to said container (1), the liquid feeder comprising nozzles;
- a collector (5) for collecting the softened and filled material from said container (1), and
- a densifier (5,6) for subjecting said filled material to at least one densification step.

25. A process for producing thermoplastic material containing a filler, said process comprising: feeding a base thermoplastic material to a container wherein the container is an apparatus for producing filled thermoplastic material, said apparatus comprising the container (1) having a mixer and stirrer (2, 3) for bringing said thermoplastic polymeric material to a softened condition, a filler feeder (7, 10) for feeding a filler into said thermoplastic material within said container, said filler feeder (7, 10) being located in the lower portion of the container where the thermoplastic material is in a softened condition; the apparatus further including a collector (5) for collecting the softened and filled material from said container (1), and densifier (5,6) for subjecting said filled material to at least one densification step, said process further comprising increasing the temperature of the base thermoplastic material until said material has reached a softened condition; mixing a filler with said softened thermoplastic material within said container (1); collecting said material filled with said filler from said container and carrying out a densification step of said softened and filled material.

\* \* \* \* \*